No. 688,848. Patented Dec. 17, 1901.
H. GRIFFIN.
APPARATUS FOR RAKING HAY.
(Application filed Nov. 9, 1900.)
(No Model.) 2 Sheets—Sheet 1.
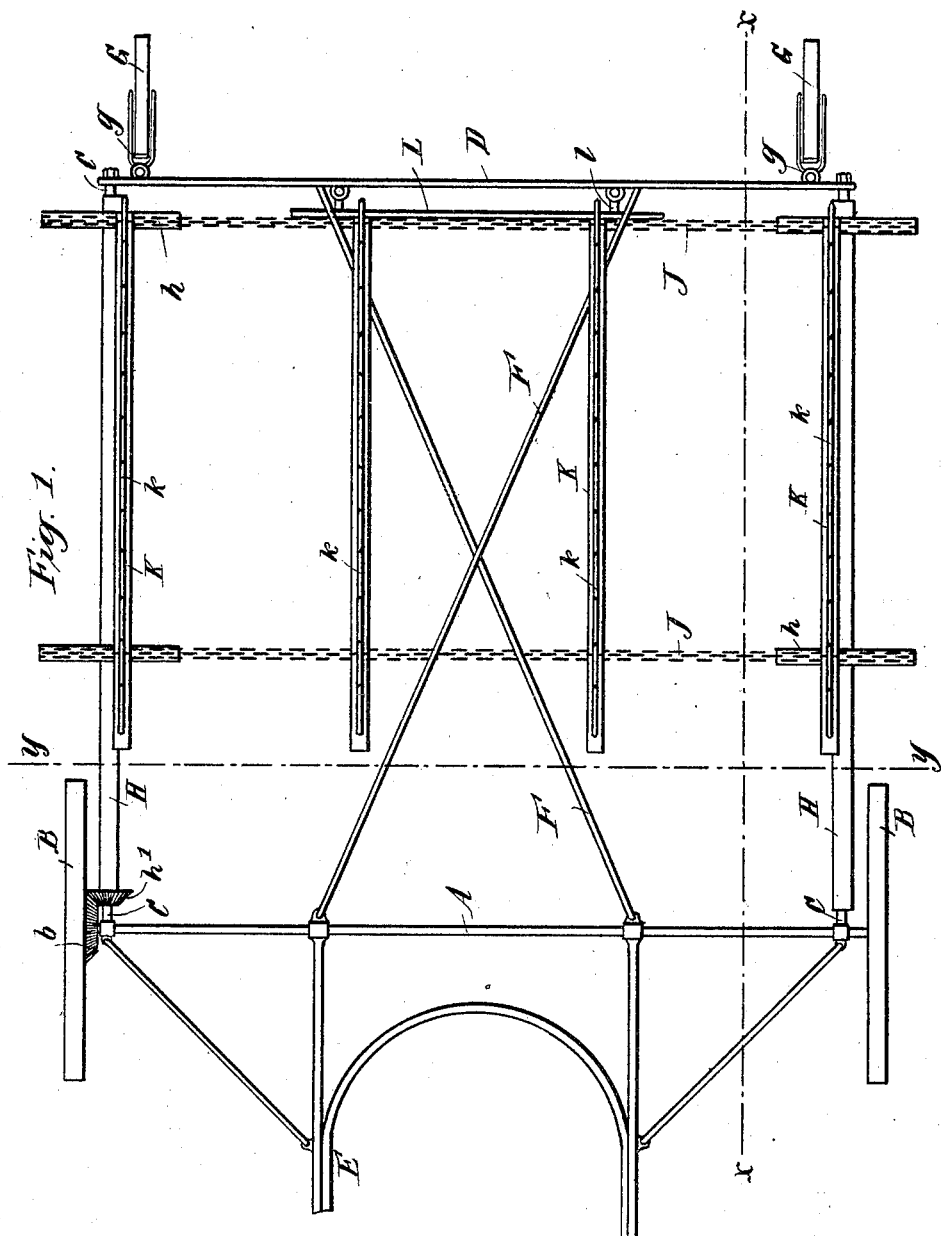
WITNESSES
William James Cox
Frank William Pattison
INVENTOR
Harold Griffin.
By his Attorney.
Geo. H. Rayner No. 688,848. Patented Dec. 17, 1901.
H. GRIFFIN.
APPARATUS FOR RAKING HAY.
(Application filed Nov. 9, 1900.)
(No Model.) 2 Sheets—Sheet 2.
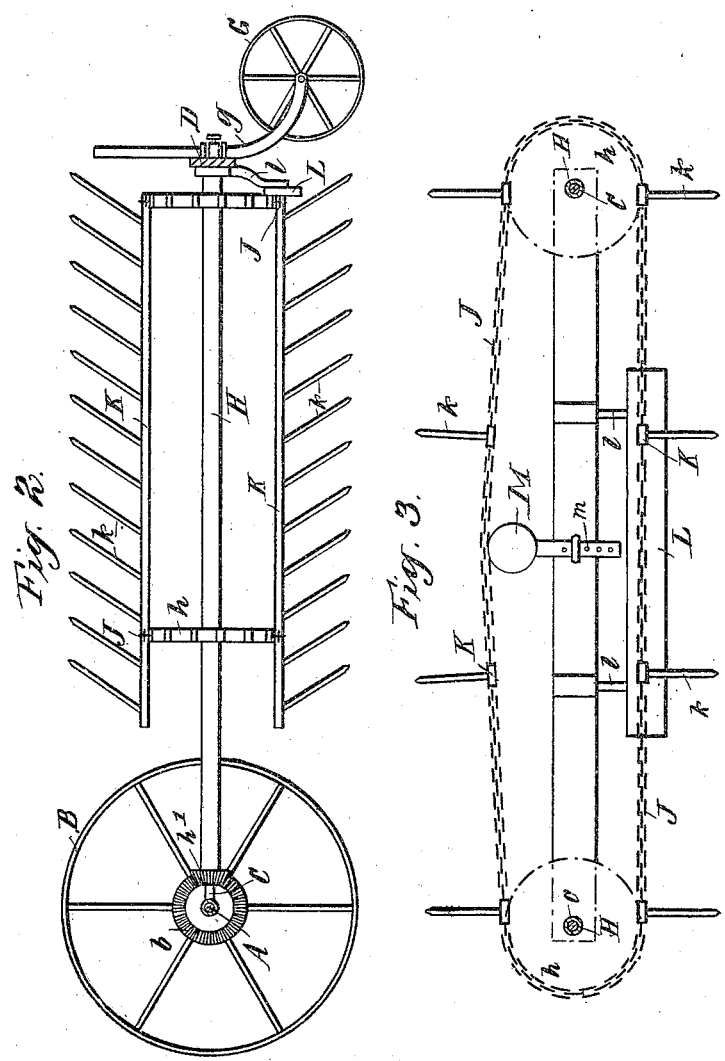
WITNESSES
William James Cox
Frank William Pattison
INVENTOR
Harold Griffin
By his Attorney.
Geo. H. Rayner.

UNITED STATES PATENT OFFICE.

HAROLD GRIFFIN, OF AYLESBURY, ENGLAND.

APPARATUS FOR RAKING HAY.

SPECIFICATION forming part of Letters Patent No. 688,848, dated December 17, 1901.

Application filed November 9, 1900. Serial No. 35,959. (No model.)

*To all whom it may concern:*

Be it known that I, HAROLD GRIFFIN, farmer, a subject of the Queen of Great Britain and Ireland, residing at Bierton, Aylesbury, county of Buckingham, England, have invented a certain new and useful Improved Apparatus for Raking Hay, of which the following is a specification.

This invention relates to an apparatus for raking hay, and provides a machine which collects the scattered hay into regular rows.

The apparatus consists of a light rigid framework carrying at each side revolving wheels or drums driven by the machine as it travels. Endless chains or bands pass over these wheels and travel transversely in a regular manner as the machine is drawn across the ground, and upon these chains or bands a set of rakes is fitted which travel with them and continuously rake up the hay and deposit it at the side of the machine.

In order that this invention may be more readily understood, reference is had to the accompanying sheet of drawings, in which—
Figure 1 is a plan of my apparatus. Fig. 2 is a section on the line $x\,x$, Fig. 1; and Fig. 3, a transverse section on the line $y\,y$. Fig. 1 shows the arrangement of the rakes. In Figs. 2 and 3 unessential parts of the apparatus are removed for greater clearness.

A is the front spindle or shaft, carrying the front supporting-wheels B and turning with them. The framework of the machine consists of this spindle and of the side bars C, supported by collars upon the spindle, with the back connecting-bar D, to which the side rods are fitted. The side rods may be connected to the back bar by shoulders upon the rods abutting against the inside of the back bar and nuts upon the ends of the rods which are screw-threaded to receive them; but any other convenient method of attaching the parts may be employed.

At the front of the machine the ordinary shafts E to receive the horse are shown; but the machine may of course be drawn or propelled by any other means. To strengthen the framework, the stays F are provided between the cross-bar and the front spindle, these stays crossing. The framework is supported at the back upon the trailing wheels G, which can turn independently and are carried by adjustable forks $g$, fitted to the rear bar of the framework and adapted to be raised or lowered upon the bar, allowing the apparatus to be thrown out of action when not required for use.

Upon the fixed side rods C are fitted the tubular rotating spindles H, each carrying a pair of sprocket-wheels $h$. One of these tubular spindles has a bevel-wheel $h'$ upon its front and gearing with a second bevel-wheel $b$ of larger size upon the hub of one of the front wheels or upon the front spindle.

Two endless chains J are fitted over the sprocket-wheels $h$, and upon these chains are carried the rakes K, of which eight are shown placed at regular intervals apart. The bars of these rakes may be passed through the links of the chains and riveted, or other means of securing them can be employed. The teeth $k$ of the rakes are preferably directed toward the back of the machine to assist in throwing off the hay as the machine travels forward. The space between the rakes may, if found desirable, be covered to prevent any hay which may be carried over by the rakes dropping onto the moving parts of the machine.

It will be seen that as the machine travels forward the bevel-gearing at one side drives the tubular spindle carrying the sprocket-wheels, and the chains with the rakes constantly traverse the machine, the rakes catching the loose hay immediately below the machine, carrying it to one side, and depositing it evenly, returning across the top.

To prevent the pressure of hay against the rakes pushing them back, and consequently rendering the chains liable to ride over the sprocket-wheels, I provide the board L, carried by the arms $l$, depending from the rear bar D, this board being placed immediately behind the back chain and receiving any excess of pressure which may cause the rakes and chains to be pushed back too far. As shown, the rakes at the back terminate with the back chain, but project some distance beyond the front chain.

If found necessary, a device for tightening the chains or bands may be provided, such as shown in Fig. 3, consisting of drums or wheels M upon a spindle carried by adjustable brackets or supports $m$, which can be raised or lowered. The chains pass over the adjusting-wheels, which are raised to take up any slack or lowered to loosen the chains.

What I claim as my invention, and desire to secure by Letters Patent, is—

In a hay-raking machine, the combination with a frame consisting of the front spindle A, carrying the wheels B and turning with them, the side bars C supported by collars upon the spindle, and the back connecting-bar D, and adjustable trailing wheels at the back of the frame, of the tubular spindles H fitted upon the side rods C and adapted to turn upon them, bevel-gearing connecting one of these tubular spindles with one of the supporting-wheels B, sprocket-wheels $h$ upon the rotating spindles, endless chains J carried by the sprocket-wheels, and rakes K upon the endless chains having their teeth directed toward the back of the machine, substantially as described and shown and for the purposes specified.

In witness whereof I have hereunto set my hand in the presence of two witnesses.

HAROLD GRIFFIN.

Witnesses:
A. M. GLASS,
F. W. PATTISON.